UNITED STATES PATENT OFFICE.

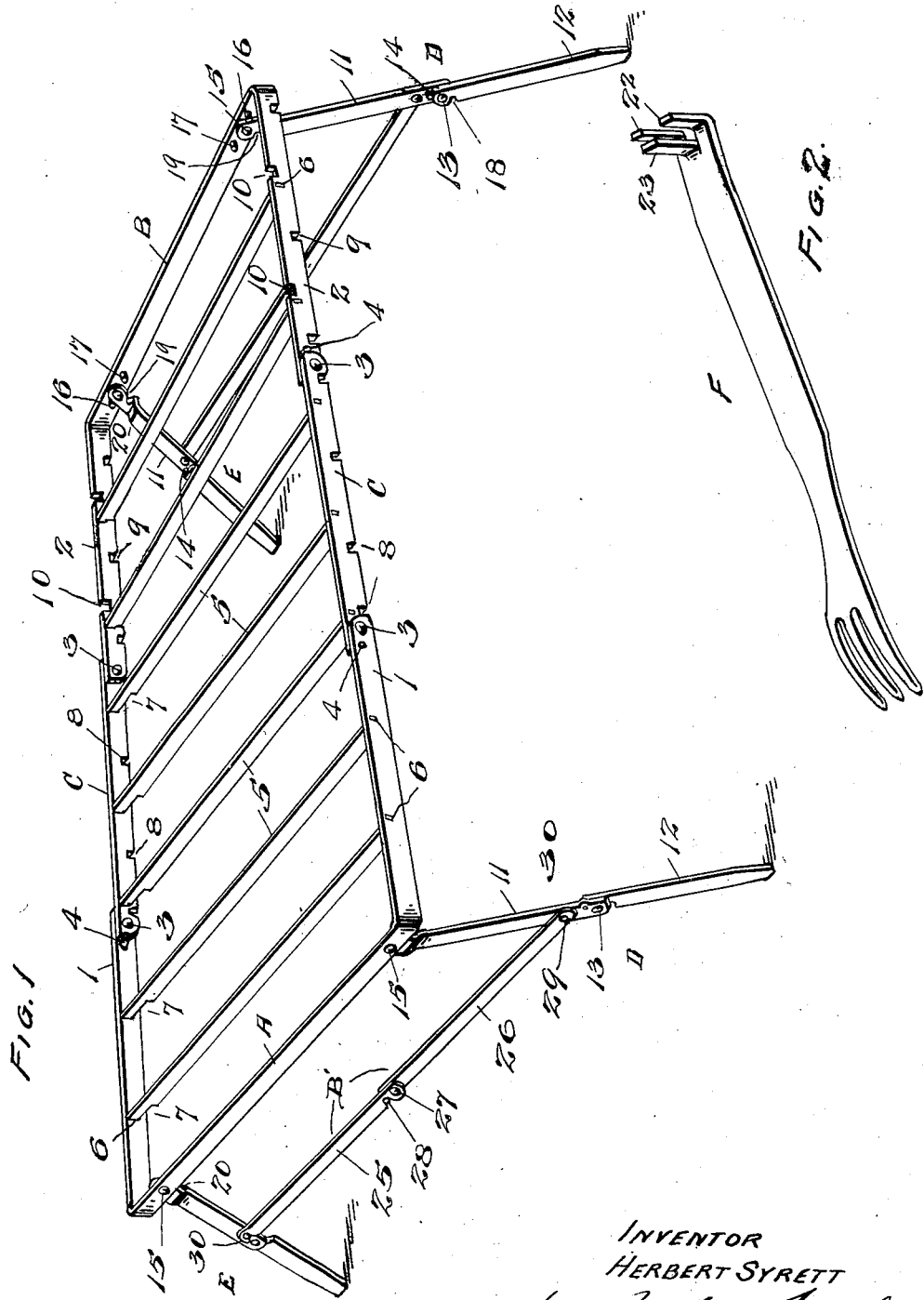

HERBERT SYRETT, OF BROOKLYN, NEW YORK.

FOLDING GRILL AND APPURTENANCES.

1,309,049.　　　　　　Specification of Letters Patent.　　Patented July 8, 1919.

Application filed December 6, 1918. Serial No. 265,531.

*To all whom it may concern:*

Be it known that I, HERBERT SYRETT, a citizen of the United States, residing at Brooklyn, New York, have invented a certain new and useful Folding Grill and Appurtenances, of which the following is a specification.

The general object of the invention is to provide a foldable grill of exceedingly light and compact form, intended principally for the use of soldiers and campers. To attain this general object in an improved way, the body of the cooking surface of the grill is made jointed and foldable, and the legs are also made jointed and foldable. In conjunction with the grill proper, a case is provided to hold it compactly, and a special implement, which may be a fork, for example, is provided, having a part especially designed to engage and manipulate the grill.

The accompanying drawing shows one exemplifying embodiment of the invention, and after considering this it will be evident that the invention may be embodied in other forms, and I do not limit myself to details, except as claimed.

Figure 1 is a perspective view of the grill "set up", or unfolded, for cooking;

Fig. 2 is a perspective view of the fork or other special handling implement.

The grill is formed principally of flat strips of suitable metal, such as cold rolled steel. The top or cooking surface of the grill when set up for cooking is defined by a foldable frame consisting substantially of the end members A and B and the intermediate side members C. The end members A and B are of approximate U-shape, and the side portions 1 of the member A and the side portions 2 of the member B are pivotally connected to the ends of the intermediate side members C by studs or rivets 3. To increase the compactness of the device side members 1 are located outside of the intermediate members C, while side members 2 are located inside of members C. Adjacent to the pivots, the respective frame members are provided with pins or studs 4 constituting stops to hold the grill top in the position shown when it is set up.

The active surface of the grill consists of transverse members 5, also preferably formed of sheet metal strips. These grill bars have reduced end portions 6 which pass through suitable holes in the side members 1, 2 and C, and are riveted up to hold the parts together. Adjacent to the side members, the bars 5 which form parts of the sections A and C of the grill are provided with notches 7 extending from the bottom of those bars approximately half way to the top. The side members C are provided with notches 8 extending upward from the bottom approximately half way to the top, and the side members 2 of member B are provided with similar notches 9, and with top notches 10, extending downward from the top approximately half way to the bottom. When the grill is folded, the section B swings down and then up underneath the section C. The notches 9 then coöperate with notches 7 of the bars 5 of section C permitting the side members 2 and C to lie close together side-by-side. Section A swings down and then up under sections B and C, and the notches 7 of the bars 5 of section A interfit with notches 8 of side members C and 10 of side members 2. Since the side members 1 of section A lie outside of the other side members when folded, they do not need to be notched; and since the bars 5 of section B do not cross the side members of any other section of the frame, they do not need to be notched.

Legs, usually four in number, are provided to support the grill over a fire or flame. These are preferably also made of similar sheet metal strips. Legs D are more conveniently made alike, and the legs E alike, but each different from the legs D in certain respects, and one leg D and one leg E is placed at each end of the grill. Each of the legs D and E comprises an upper part 11, a lower part 12, and these are pivoted together at 13; and a stop 14 is also provided at the pivot to limit the opening movement. The upper parts 11 are also pivoted to the end members B and A, respectively, at 15, and stops 16 and 17 are provided adjacent to the pivots 15 to limit the opening and closing movements of the legs. Adjacent to pivots 15, the lower leg members 12 are provided with notches 18, and the upper leg members 11 are provided with notches 19 adjacent to notches 15, these notches being respectively to accommodate the stops or studs 14 and 17 when the legs are folded.

The upper members 11 of legs E are preferably provided with an offset portion adjacent to their upper ends produced by the double bends 20; while the upper members 11 of legs D may be left straight. By this arrangement when the legs are folded, the leg D folds with its members close together and close to the end frame member of the grill, while owing to the offset produced by curves 20 the legs E fold so that their members are close together and lie close to and inwardly from the legs D.

For convenience in handling the grill or the utensils, or both, especially when they are hot, a special implement F is, desirably, provided consisting in this instance of a fork having at the end of the handle, remote from the tines, projections or prongs, usually three in number, of which the prongs 22 are in line with each other, and the prong 23 is in a plane removed from that of prongs 22, but is located between them in respect to a plane in line with the axis of the implement. This provides spacing of the tines such that they may grasp between them the members of the grill or utensils adapted to be used with it. A convenient way of producing the prongs 22 and 23 consists, as shown, of slitting the end of the implement and bending the prongs up into the position shown. The implement F is conveniently and preferably made from the same material as the parts of the grill and when so made it packs very compactly and conveniently with the grill.

To hold the legs in proper position when the grill is set up, and to stiffen and brace the whole structure, braces B are provided, each comprising two members, 25 and 26, hinge-jointed at 27. Stops 28 are provided, to limit the movement of the members 25, 26, when the braces are straightened out. At the free end of each member is a notch, or slot 29, adapted to fit a pin 30 on one of the leg-members 11. The braces are applied to the legs in a way which is obvious in Fig. 1, and when the grill is folded, the braces are removed and folded, and may then be packed in with the grill.

In some cases, the braces might each be attached permanently at one end to one of the leg members.

I claim:—

A foldable grill comprising U-shaped end members, straight intermediate side members each of which is pivoted at one end inside of and at the other end outside of the parts of the end members, means for limiting the unfolding movement of the pivoted parts, grill bars connecting the side members, folding legs at the corners of the grill, and foldable leg braces, each brace comprising two hinged members, a stop to hold the members in line when extended, and notches near the free ends of the members to engage pins on members of two of the legs at the same end of the top.

HERBERT SYRETT.